E. MINKLER.
Stump-Extractors.

No. 157,533.            Patented Dec. 8, 1874.

WITNESSES            INVENTOR
Edgar Minkler
By Leggett & Leggett
Attorneys.

UNITED STATES PATENT OFFICE.

EDGAR MINKLER, OF ADDISON, NEW YORK, ASSIGNOR OF ONE-HALF HIS RIGHT TO WILLIAM R. HUNTER, OF SAME PLACE.

IMPROVEMENT IN STUMP-EXTRACTORS.

Specification forming part of Letters Patent No. 157,533, dated December 8, 1874; application filed October 27, 1874.

*To all whom it may concern:*

Be it known that I, EDGAR MINKLER, of Addison, in the county of Steuben and State of New York, have invented certain new and useful Improvements in Stump-Extractors; and I do hereby declare the following to be a full, clear, and exact description of the invention, such as will enable others skilled in the art to which it pertains to make and use it, reference being had to the accompanying drawings, which form part of this specification.

My invention relates to an improvement in stump-extractors; and consists in the combination of devices and appliances hereinafter set forth and claimed.

Figure 1:
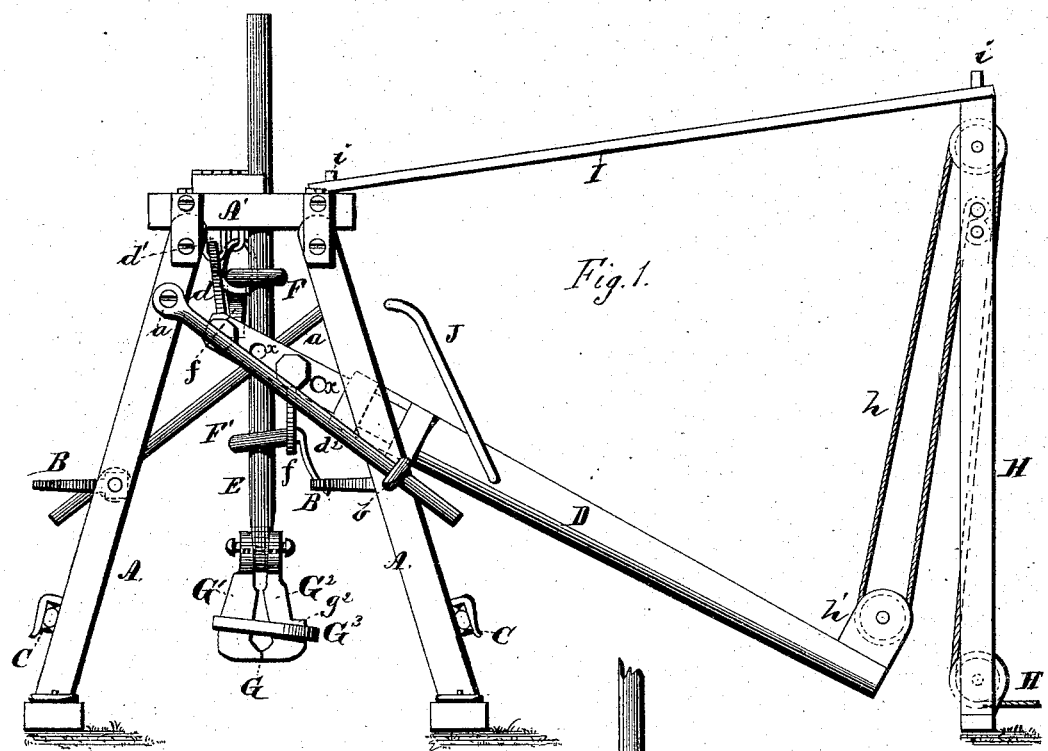
Figure 2:
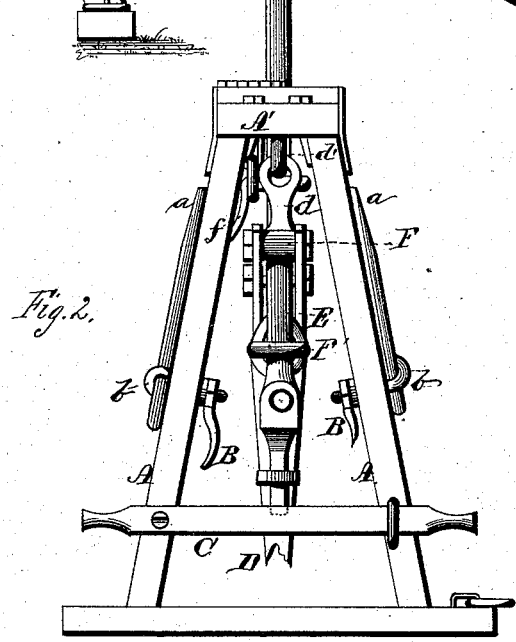

In the drawings, Figure 1 is a side elevation, and Fig. 2 an end elevation, of a machine showing my improvements.

A A are the standards of the frame, arranged to be adjusted at proper distance apart at the bottom. $a$ $a$ are braces, attached at their upper ends to the frame A, their lower ends being loose, but passing through loops $b$ of gripe-bolts B, by means of which they may be secured in position. C are handles, which fold up against the side of the frame, and by means of which the frame can be handled and elevated. D is a lever, having its extreme forward end attached by a clevis, $d$, and staple $d'$ to the top of the frame A'. At this end of the lever D it is suitably ironed, so as to permit the draw-bar E to pass up through it, and to furnish a bearing for the clevises $d$ and $d^2$. Attached to the top A' of the frame is a link, which supports the friction-collar F. To the lever D is attached a link, $d^2$, which supports the other friction collar F', each of which have arms $f$, by which they can be released when desired. The draw-bar E passes up through these two friction-collars, and is supported by them. At the bottom of the bar E is a clamp or clutch, G, formed of two jaws, $G^1$ and $G^2$, and a link, $G^3$. The jaw $G^1$ is notched to receive the link, and the jaw $G^2$ is recessed along its upper portion, in which recess the link may slide and permit the jaws to be opened; but when closed the link drops down over a shoulder, $g^2$, at its lower end and securely locks them together. H is a derrick, having a pulley-block at its upper and lower ends, and a cord, $h$, passes over the same and over a pulley, $h'$, on the end of the lever D. A horse or other power is applied at the end H', and raises the draw-bar E by the upward motion of the lever D. The lever is then drawn down again to the ground, and in going down the lower friction-collar F' is released and falls with it, but immediately renewing its grip when the lever starts on its upward movement; but this upward movement releases the upper friction-collar F, which in turn seizes and prevents the bar E from dropping during the descending motion of the lever. When it is desired, however, to release the bar entirely, and permit it to drop, it is effected by pressing upon the arms $f$ simultaneously. I is a bar, which sustains the top of the derrick by slipping over studs $i$ upon the derrick and the frame A'. A loop, J, is arranged to loop over the stud $i$ on the frame A', to sustain the lever E in transporting the machine. The end of the lever D is provided with a series of holes, $x$ $x$, whereby the length of stroke of the lever may be lengthened or shortened by adjusting the clevises therein.

Having thus fully described my invention, what I claim as new, and desire to secure by Letters Patent, is—

1. As a means for giving to the standards A any desired spread, the combination, with the said standards, of the brace-rods $a$ hinged loosely at the top to the standards, and the clutch-bolts B $b$, substantially as and for the purposes described.

2. The combination, with the adjustable-hinged supporting-frame, consisting of the standards A A, hinged to the platform A' and adjustable brace-rods $a$ $a$ and gripe-bolts B $b$, of the draw-bar E, provided with the clamping-jaws $G^1$ $G^2$ and locking-link $G^3$, single lever D, friction-collars F F', and hoisting-derrick H I, substantially as and for the purposes described.

3. The combination, with the draw-bar E, of the clutch G, composed of notched jaw $G^1$, the recessed jaw $G^2$, provided with the wedging shoulder $g^2$ and the link $G^3$, substantially as and for the purposes described.

4. In combination with the draw-bar E G, hinged adjustable frame A A', and derrick H I, the single lever D, operated to lift only by an upward motion, provided at its ends with holes $x$, whereby the length of stroke may be regulated, and a supporting-loop, J, substantially as and for the purposes described.

In testimony that I claim the foregoing I have hereunto set my hand and seal this 23d day of October, 1874.

EDGAR MINKLER. [L. S.]

Witnesses:
 W. R. HUNTER,
 W. A. SMITH.